United States Patent
Künzel

(10) Patent No.: US 6,900,609 B2
(45) Date of Patent: May 31, 2005

(54) METHOD AND CONTROL STRUCTURE FOR DAMPING LOW-FREQUENCY LOAD OSCILLATIONS IN DRIVES WITH A MOTOR AND LOAD

(75) Inventor: Stefan Künzel, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 547 days.

(21) Appl. No.: 10/005,561

(22) Filed: Dec. 4, 2001

(65) Prior Publication Data

US 2002/0130564 A1 Sep. 19, 2002

(30) Foreign Application Priority Data

Mar. 14, 2001 (DE) .......................... 101 12 615
Jul. 31, 2001 (DE) .......................... 101 37 496

(51) Int. Cl.[7] .......................... G05B 11/36; G05B 11/42
(52) U.S. Cl. .................. 318/609; 318/610; 318/611; 318/612; 318/618; 701/41
(58) Field of Search .......................... 318/561, 629, 318/609, 610, 611, 632, 432, 433, 560, 625; 180/65.6, 65.8; 701/41

(56) References Cited

U.S. PATENT DOCUMENTS

| | | | | |
|---|---|---|---|---|
| 3,753,063 A | * | 8/1973 | Graf | 318/806 |
| 3,764,872 A | * | 10/1973 | Boice | 318/798 |
| 3,813,589 A | * | 5/1974 | Boice | 318/798 |
| 4,143,311 A | * | 3/1979 | Lee | 318/611 |
| 4,267,496 A | * | 5/1981 | Ivanov et al. | 318/615 |
| 4,395,904 A | * | 8/1983 | Ivanov et al. | 73/118.1 |
| 4,498,037 A | * | 2/1985 | Razavi | 318/561 |
| 4,914,365 A | * | 4/1990 | Murakami et al. | 318/609 |
| 5,528,119 A | * | 6/1996 | Rundqwist et al. | 318/632 |
| 5,646,495 A | * | 7/1997 | Toyozawa et al. | 318/625 |
| 5,959,422 A | * | 9/1999 | Kang | 318/561 |
| 6,046,560 A | * | 4/2000 | Lu et al. | 318/432 |
| 6,127,793 A | * | 10/2000 | Kerner | 318/561 |
| 6,161,068 A | * | 12/2000 | Kurishige et al. | 701/41 |
| 6,196,345 B1 | * | 3/2001 | Lyons et al. | 180/65.8 |
| 6,274,994 B2 | * | 8/2001 | Tsutsui | 318/560 |
| 6,274,995 B1 | * | 8/2001 | Kerner | 318/611 |
| 2003/0124919 A1 | * | 7/2003 | Geil | 440/1 |

FOREIGN PATENT DOCUMENTS

| | | | |
|---|---|---|---|
| JP | 59-164543 | * | 9/1984 |
| JP | 8-2877 | * | 1/1996 |
| JP | 8-168281 | * | 6/1996 |
| JP | 11-292411 | * | 10/1999 |

* cited by examiner

*Primary Examiner*—Paul Ip
(74) *Attorney, Agent, or Firm*—Baker Botts L.L.P.

(57) ABSTRACT

According to the invention, the controller cascades are suitably divided up and the oscillation damped only in the load rotational-speed controller. Here, a motor rotational-speed setpoint value (z) of a quickly regulated motor rotational-speed controller (9) and not the motor torque, is selected as the connection point for a load acceleration (i). In order to achieve a shorter transient response time, according the invention the difference between a setpoint rotational speed (x) and load rotational speed (y) is connected to the motor rotational-speed setpoint value (z). The solution in principle according to the invention which is presented has, in contrast to other known methods, the advantage that the actuation of the corresponding controllers is comparatively simple with very good control results.

15 Claims, 3 Drawing Sheets

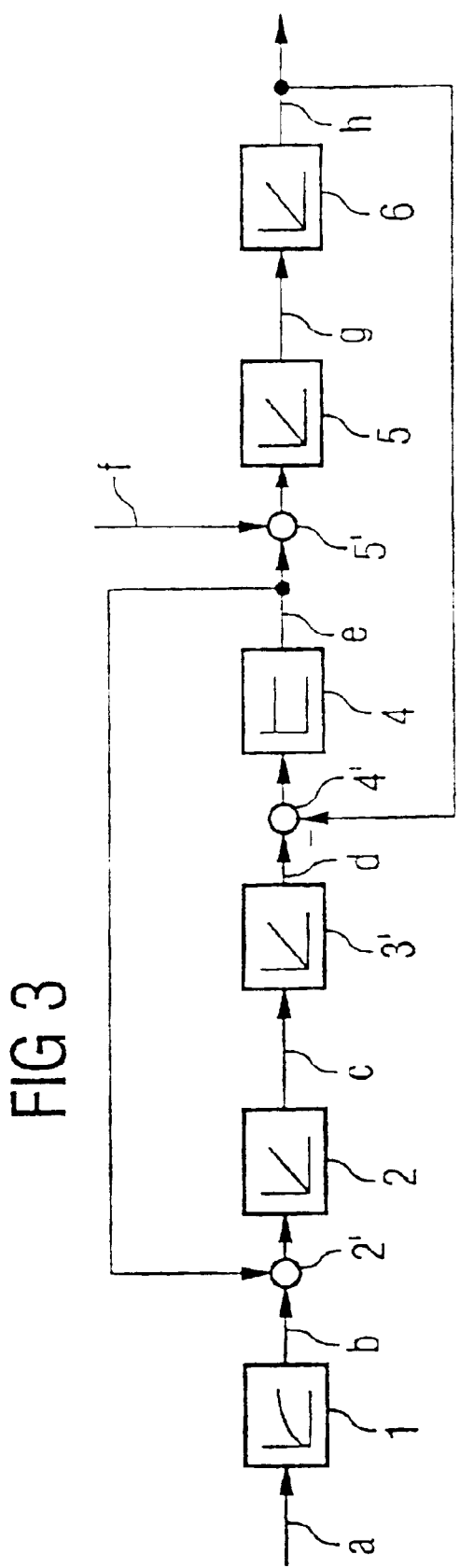

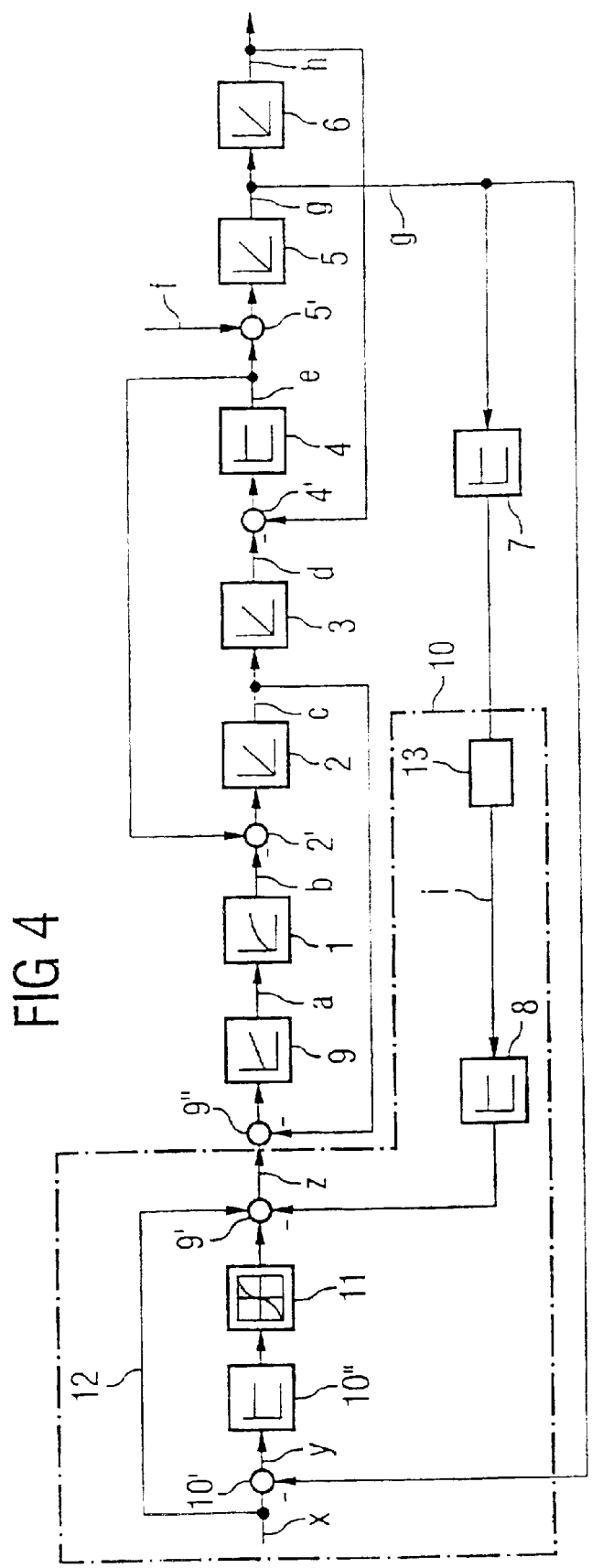

METHOD AND CONTROL STRUCTURE FOR DAMPING LOW-FREQUENCY LOAD OSCILLATIONS IN DRIVES WITH A MOTOR AND LOAD

FIELD OF THE INVENTION

The invention relates to a method and a control structure for damping low-frequency load oscillations in drives with a motor and load, the motor having a motor-speed controller, and the load having a load-speed controller.

BACKGROUND OF THE INVENTION

In a drive control, it is known to move a load mass L by a shaft W or a transmission G using a controlled drive or motor M. It is irrelevant whether the motor M or the load L has a linear or a rotary movement, and whether the transmission G converts a rotary movement into a linear movement or translatory movement, or vice versa, or whether rotary movements are transmitted to linear movements, and linear movements are transmitted to rotary movements. The two illustrations according to FIG. 1 and FIG. 2 show two possible drive configurations. FIG. 3 shows a block diagram of a model of the associated controlled system in which a setpoint value (a) is predefined at the input end for a controller 1. An actual value (b), which is proportional to a torque from which the motor rotational speed (c) is obtained by integration 2, and the motor position (d) is obtained by further integration 3 which is then set up at the output end. The elasticity of the shaft W or of a transmission G is taken into account by means of a spring component 4. The output value (e) corresponds to the spring moment which reacts on the motor rotational speed (integrator 2) via the additional point 2'. The spring moment (e) is logically linked to a load torque (f). The load rotational-speed actual value (g) is obtained from this by further integration 5, and the load position actual value (h) is obtained by further integration 6. Said load position actual value (h) is fed back 4' negatively to the spring component 4 at the input end.

While the following is limited to rotary movements for the sake of illustration, it also applies in the same way to linear or mixed linear/rotary movements.

Under specific conditions of motor inertia, load inertia, and the elasticity of the shaft W and/or of the transmission G, low frequency oscillations occur between the motor M and load L. These are referred to below as load oscillations which are frequently very destructive and very difficult to control in terms of control technology. Frequently, in systems which are capable of oscillation, state controllers are used for damping such load oscillations. These controllers are generally so complex that they can only be applied by academic control specialists. Accordingly, these state controllers are unsuitable for a wide-ranging product solution, especially with a view to simple actuation.

Another known solution uses a difference rotational-speed feedback and difference position feedback to the torque's setpoint value of the motor M. In addition, a superimposed motor rotational-speed controller also supplies a torque setpoint value which is added to the difference rotational-speed feedback and difference position feedback. This results in a complex structure similar to that of the classic state controller which is difficult to set. While the motor rotational-speed controller compensates the feedback values to a certain extent, the setting of the motor rotational-speed controller generally has a strong influence on the effect of the connection.

One way of avoiding this could be to control the load rotational speed directly without a motor rotational-speed controller. However, this is also problematic because the controlled system has three poles at the edge of stability and does not have any zero point, which makes stable control possible only within a very narrow band. It is noted here that there is also a further pole at the edge of stability as a result of an I-component of the controller which makes actuation difficult.

If no measures for actively damping load oscillations are taken, excitation of the oscillation must be avoided by controlling the movement. The result of this is that the movement processes take a comparatively long time, and that only a small degree of control compliance can be achieved. Interference can then excite oscillations which are not actively damped.

SUMMARY OF THE INVENTION

The object of the present invention is therefore to find a possible way of damping low-frequency load oscillations in drives with a motor and load which also permit simple actuation when the control results are good. This object is achieved by means of a method for damping low-frequency load oscillations in drives having a motor and load, a motor rotational-speed controller and a load rotational-speed controller, whereby suitable connection values to the rotational-speed setpoint value of a motor rotational-speed controller are generated.

According to the present invention, the damping only takes place in a load rotational-speed controller which is superimposed on the motor rotational-speed controller. This is carried out, for example, by virtue of the fact that, for the purposes of damping, a load acceleration, which is preferably multiplied by a predefinable factor, is connected to an input-end motor rotational-speed setpoint value of the motor rotational-speed controller. Incorporated hereby by reference are the originally filed German applications DE 10112615.8 and 10137496.8.

In a preferred embodiment of the method according to the present invention, the load acceleration is measured directly. Alternatively, the load acceleration can also be determined by differentiating the respective load rotational speed or from the difference position, that is to say the difference between the motor position and load position.

It is preferred if, for the purpose of load rotational-speed control, a difference formed from the rotational-speed setpoint value and the load rotational speed (which is preferably multiplied by a predefinable factor) is connected to the input-end motor rotational-speed setpoint value of the motor rotational-speed controller. In this way, a significantly shortened transient response time can be achieved. If the difference formed from the rotational-speed setpoint value and load rotational speed is multiplied by a predefinable factor before the connection to the motor rotational-speed setpoint value, this transient response time can then be influenced. In order to avoid a "wind-up" of the controlled system, the difference value for the load rotational-speed control is preferably limited before the connection to the motor rotational-speed setpoint value. Furthermore, in the method according to the invention, a pilot control of a load rotational-speed setpoint value can also be performed past the load control to the motor rotational-speed controller.

In a further preferred embodiment of the method according to the invention, the load rotational-speed control has at least one proportional control component and/or one differential control component. Furthermore, it is possible with the method according to the invention to perform a load position control above the load rotational-speed control.

The object of the present invention is also achieved by means of a cascade controller structure for damping low-frequency load oscillations in drives with a motor and load by means of a subordinate motor rotational-speed controller and a superordinate load rotational-speed controller. A load acceleration which is connected to the motor rotational-speed controller at the input end is also preferably used in this embodiment for damping.

The load rotational-speed controller is preferably implemented by means of input-end connection of a difference formed from the rotational-speed setpoint value and load rotational speed to the motor rotational-speed controller. As a result, a shortened transient response time of the controlled structure there is advantageously achieved. This transient response time can be influenced selectively by providing a means for multiplying the difference formed from the rotational-speed setpoint value and load rotational speed before the connection to the motor rotational-speed controller.

In yet another preferred embodiment of the controlled structure according to the invention, a means for limiting the difference formed from the rotational-speed setpoint value and load rotational speed is provided before the connection to the motor rotational-speed controller. As a result, a "wind-up" of the controlled system can be avoided. It has proven advantageous here if the load rotational-speed controller has at least one proportional and/or one differential control component. Furthermore, as a supplement, a pilot control of a load rotational-speed setpoint value can be provided past the load controller to the motor rotational-speed controller. The control structure according to the invention can also advantageously be extended by a load position controller above the load rotational-speed controller, as a result of which the control properties can be improved further.

In another preferred embodiment, a filter unit is provided for filtering the load acceleration which is connected to the motor rotational-speed controller at the input end.

The present invention thus provides a method and a corresponding control structure which actively damp load oscillations and additionally permit significantly shorter transient response times for a rotational-speed control circuit or position control circuit in comparison with known controls. The only precondition is that the motor rotational speed and the load rotational speed are available. These can be obtained, for example, using a motor position measurement system and a load position measuring system.

The load rotational-speed controller preferably comprises at least some of the following components:
  A pilot control which ensures that no setpoint/actual difference of the load rotational-speed controller remains in a steady-state, even if the load rotational-speed controller does not have an integrating or I-component;
  A component which is proportional to the load acceleration and which is filtered with a filter as required, with the load acceleration being measured, for example, directly and generated from the load rotational speed or the load position by differentiation or determined from the difference position; and
  A proportional component (difference between the rotational-speed setpoint value and load rotational-speed actual value multiplied by a adjustable value) which can influence the transient response time and shorten it, for example and which can bring about better interference suppression. In order to avoid a "wind-up" of the controlled system, the proportional component for load rotational-speed control is preferably limited to the motor rotational-speed setpoint value before the connection.

Two significant steps of the invention are dividing up of the controller cascades, and the decision to damp the oscillation only in the load rotational-speed controller. In comparison with known methods, present invention results in the simple actuation of the corresponding controllers with the control results being very good.

BRIEF DESCRIPTION OF THE DRAWINGS

Further advantages and details of the invention are described below in context with an exemplary embodiment and in conjunction with the drawings, in which:

FIG. 3 shows a block diagram of a model of the associated controlled system; and FIG. 4 shows a block diagram of a control structure according to the present invention for damping load oscillations.

DETAILED DESCRIPTION OF THE INVENTION

Figure 1:
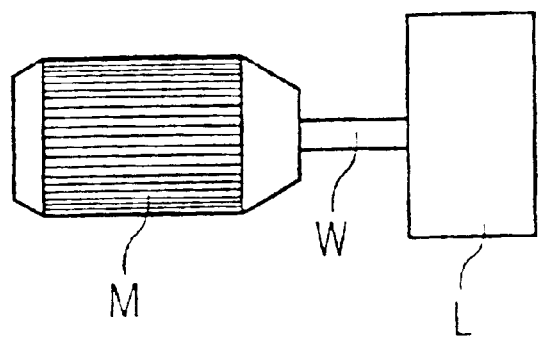
FIG. 1 shows a first drive configuration with motor and load.
Figure 2:
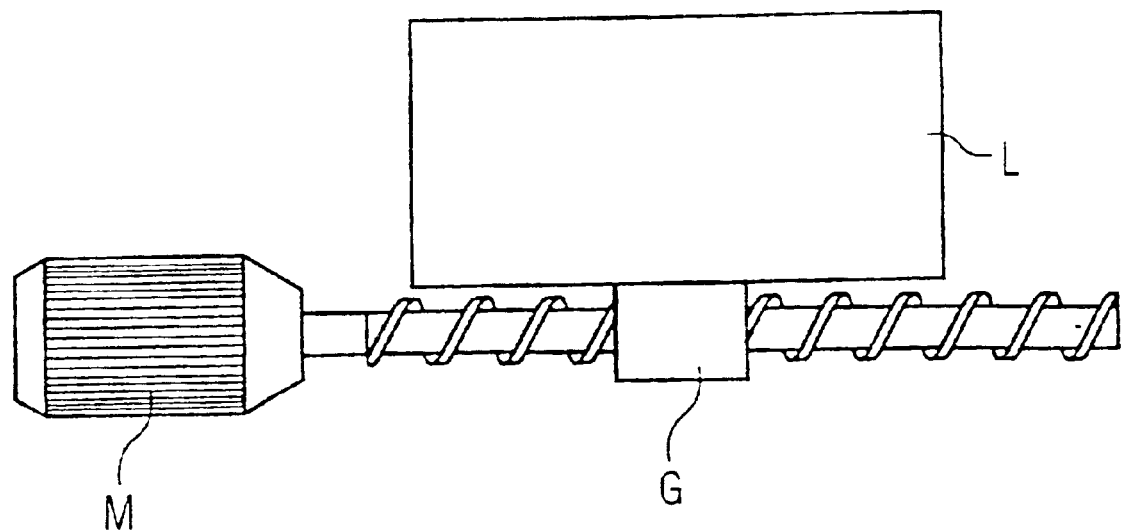
FIG. 2 shows a further drive configuration with motor and load.

FIG. 1 to FIG. 3 have already been explained in the background of the invention. FIG. 4 shows a cascade control structure according to the present invention for the damping load oscillations and which incorporates the controlled system shown in FIG. 3.

In FIG. 4, a motor-speed setpoint value (z) of a motor-speed controller 9 which is subject to high-speed control and which is superimposed on the current controller 1 illustrated in FIG. 4 is used as the connection point. The embodiment of the motor-speed controller 9 as a PI controller is not essential and other controllers may be used. The motor-speed controller 9 can, if it is a low-frequency load oscillation, always be quickly set. This is due to the fact that, in addition to the oscillation poles of the load oscillation, a conjugate complex zero position pair with a relatively low frequency occurs in the controlled system. Therefore, provided that the other small constants of the system and controller cause a negligible phase rotation in the oscillation frequency, the oscillation can easily be damped for the motor-speed controller 9. For this reason, the present invention can preferably be applied to low-frequency load oscillations. High-frequency load oscillations are generally not as disruptive.

For the motor-speed controller, the motor-speed actual value (c) is subtracted from the motor-speed setpoint value (z) in a connection point 9" and fed to the motor-speed controller 9. The load-speed controller 10, having combined components are illustrated by a dotted line, predefines the motor-speed setpoint value which is formed in the summation point 9'. Here, the filtered load acceleration (i) multiplied by an adjustable factor is included as well as the pilot control value 12, and a limited proportional component 10" of the load-speed controller 10, which is formed from the -speed setpoint value (x) minus the load-speed actual value (g) in the summation point 10', is subjected to the proportional amplification in 10" and limited with the limiter 11.

The load acceleration (i) can either be measured directly or by differentiation 7 and possible subsequent filtering from the load rotational speed (g) or determined by the difference position. In this way, the desired damping can be set with a damping connection 8. As a supplement, it is also advantageous if this acceleration feedback is optionally filtered. A corresponding filter 13 can be arranged between the elements 7 and 8. It is possible, for example, to use a PT1 or PT2 smoothing means as filter, but other filters are also conceivable. The filter 13 eliminates possible problems which are caused by the amplification of noise from the differentiation, or by further higher-frequency oscillations. This component thus has an oscillation-damping effect.

In order to change the transient response time, according to the present invention the difference between the setpoint speed and load speed is connected to the motor-speed setpoint value after multiplication by a further adjustable factor 10". In order to avoid a controlled-system wind-up, this connection value is also limited in a limitation 11 which follows the load-speed controller 10". Because the motor speed (c) and the load speed (g) are the same in steady-state terms, a pilot control 12 of the load-speed setpoint value (x) past the load-speed controller 10" with limitation 11 to the motor-speed controller 9 is provided as a supplement.

The setting of the damping and transient response time can be carried out virtually independently of one another by means of these two interventions, which significantly simplifies the actuation in comparison to known damping measures. If the frequency of the load oscillation is known, simple adjustment formulas are obtained for both factors. A formula which additionally includes the motor inertia torque can also be specified for the necessary limitation value in order to avoid the controlled-system wind-up.

The load rotational-speed controller 10 can preferably also comprise all the connections, (pilot control, acceleration connection and proportional connection). For the sake of simplicity, only the proportional connection is designated as a load rotational-speed controller 10 in FIG. 4.

FIG. 4 includes parts of the load rotational-speed controller only in the actual-value feedback (acceleration) and parts both for setpoint-value feedback and for actual-value feedback (for example the P component). However, the functioning of the controller according to the present invention is independent of whether only the actual value, or the setpoint value and actual value are connected. For example, instead of the damping connections shown in FIG. 4 with the elements 7 and 8, the load rotational-speed controller 10 could alternatively also be embodied as a PD controller, that is to say with proportional and differential component.

Further variations of this cascade control structure according to the present invention which is described above and illustrated in FIG. 4 are also conceivable. However, the essential elements here are a cascade structure with a subordinate motor rotational-speed controller 9 and a superordinate load rotational-speed controller 10 with at least one proportional control component or P component and/or one differential controller component or D component. These controller components can be applied only in feedback or also in the set-value branch. A position controller (not shown) which controls the load position (h) can also be arranged above the load rotational-speed controller.

I claim:

1. A cascade control structure for damping low frequency load oscillations in drives having a motor having a control path and a load comprising:

a motor speed controller for generating a first set point value, wherein said motor is controlled by said first set point value wherein a load speed actual value and a motor speed actual value are generated within said control path of said motor, a load speed controller receiving said load speed actual value and generating a second set point value, a means receiving said second set point value and subtracting the motor speed actual value generating a first difference for feeding said first difference into an input of said motor speed controller.

2. The cascade control structure according to claim 1 wherein the load speed controller comprises a means for generating a limited proportional component by receiving a third set point value, subtracting said load speed actual value, and subjecting the result of the subtraction to a proportional amplification and a limitation, a means for generating the second set point value by adding a pilot control value and said limited proportional component and subtracting a load acceleration.

3. The cascade control structure according to claim 1 wherein said motor speed controller comprises a PI controller.

4. The cascade control structure according to claim 5 wherein said load acceleration is measured directly.

5. The cascade control structure according to claim 2 wherein said load acceleration is determined through differentiating said load speed value.

6. The cascade control structure according to claim 2 wherein said load acceleration is determined from a difference between a motor position and a load position.

7. The cascade control structure according to claim 2 wherein said load acceleration is filtered.

8. The cascade control structure according to claim 2 wherein said load acceleration is damped.

9. A method for damping low frequency load oscillations in drives having a motor with a control path, a load, and a cascade control structure comprising the steps of:

generating a first set point value, generating a load speed actual value and a motor speed actual value, generating a second set point value from said load speed actual value, subtracting the motor speed actual value from said second set point value generating a first difference and using said first difference for generating said first set point value.

10. The method according to claim 9 further comprising the steps of:

generating a limited proportional component by receiving a third set point value, subtracting said load speed actual value, and subjecting the result of the subtraction to a proportional amplification and a limitation, generating the motor speed set point value by adding a pilot control value and said limited proportional component and subtracting a load acceleration.

11. The method according to claim 10 wherein said load acceleration is measured directly.

12. The method according to claim 10 wherein said load acceleration is determined through differentiating said load speed value.

13. The method according to claim 10 wherein said load acceleration is determined from a difference between a motor position and a load position.

14. The method according to claim 10 wherein said load acceleration is filtered.

15. The method according to claim 10 wherein said load acceleration is damped.

* * * * *